US009656159B1

(12) United States Patent
Akpan et al.

(10) Patent No.: US 9,656,159 B1
(45) Date of Patent: May 23, 2017

(54) SYSTEM AND METHOD FOR FACILITATING PLAYER PAYMENTS FOR IN-GAME ACTIONS THROUGH ACTIVITIES EXTERNAL TO AN ONLINE GAME

(71) Applicant: KABAM, INC., San Francisco, CA (US)

(72) Inventors: Inyang Akpan, San Francisco, CA (US); Bryan Tsao, San Carlos, CA (US); Albert Wei, San Francisco, CA (US); John Kim, San Francisco, CA (US); David McNeill, San Francisco, CA (US); Kevin Chanthasiriphan, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 468 days.

(21) Appl. No.: 14/038,655

(22) Filed: Sep. 26, 2013

(51) Int. Cl.
*A63F 9/24* (2006.01)
*A63F 13/00* (2014.01)
*G06F 17/00* (2006.01)
*G06F 19/00* (2011.01)
*A63F 13/85* (2014.01)

(52) U.S. Cl.
CPC .............. *A63F 13/00* (2013.01); *A63F 13/85* (2014.09)

(58) Field of Classification Search
CPC ..... A63F 2300/575; A63F 13/00; A63F 13/85
USPC .......................................................... 463/42
See application file for complete search history.

(56) References Cited

U.S. PATENT DOCUMENTS

2002/0161645 A1* 10/2002 Walker .................. G06Q 30/02 705/14.19
2005/0261062 A1 11/2005 Lewin et al. .................. 463/42
2008/0214148 A1 9/2008 Ramer et al. ............. 455/414.1
2011/0300923 A1* 12/2011 Van Luchene .......... A63F 13/10 463/25
2011/0313853 A1 12/2011 Ramer et al. ............. 705/14.46
2012/0066198 A1 3/2012 Ramer et al. ................ 707/709
2013/0032635 A1 2/2013 Grinvald ...................... 235/384
2013/0080447 A1 3/2013 Ramer et al. ................ 707/748

* cited by examiner

*Primary Examiner* — Omkar Deodhar
*Assistant Examiner* — Wei Lee
(74) *Attorney, Agent, or Firm* — Sheppard Mullin Richter & Hampton LLP

(57) ABSTRACT

One aspect of the disclosure relates to providing players of an online game the option of performing one or more activities external to the online game instead of spend virtual currency to accomplish a specific action in the game. This option is presented through an interface that creates and displays separate "offer walls" for separation actions in the game. The activities may thematically correspond to the type of action the player wants to perform.

12 Claims, 9 Drawing Sheets

FIG. 5

SYSTEM AND METHOD FOR FACILITATING PLAYER PAYMENTS FOR IN-GAME ACTIONS THROUGH ACTIVITIES EXTERNAL TO AN ONLINE GAME

FIELD

The disclosure relates to facilitating player payments for in-game actions through activities external to an online game.

BACKGROUND

Various online games require specific items to unlock upper levels. However, many players are unwilling to spend hard currency on these items, and over time, fall behind in the game. In-game promotions and/or offers often allow players to obtain virtual currency through a third party site. This causes delay, and makes it more difficult for a player to unlock upper levels without actually spending hard currency.

SUMMARY

One aspect of the disclosure relates to providing players of an online game the option of performing one or more activities external to the online game instead of spend virtual currency to accomplish a specific action in the game. This option is presented through an interface that creates and displays separate "offer walls" for separation actions in the game. The activities may thematically correspond to the type of action the player wants to perform.

A system for facilitating player payments for in-game actions through activities external to an online game may include one or more processors configured to execute compute program modules. The program modules may comprise a game module, a user module, a proposed activity module, a game shop module, a player interface module, a billing module and/or any other modules.

The game module may be configured to execute an instance of online game. The game module may implement the instance of the online game to facilitate presentation of the online game on to players on client computing platforms. The presentation may facilitate participation of the players in the game through the reception of commands from the players through the client computing platforms and/or any other platforms. The corresponding actions may be executed in the instance of the online game. The actions may be associated with costs such that completion of a first action in the instance of the online game in response to a command received from a first player may require satisfaction of a first cost associated with the first action by the first player and/or any other player. The first cost may include one or both of time and/or expenditure of a virtual item.

The proposed activity module may be configured effectuate presentation to the players of sets of proposed activities for the individual actions in the online game that can be performed by the players instead of satisfying the costs of the individual actions for completion of the actions. The sets of proposed activities may include a first set of proposed activities that is specific to the first action and/or any other action. The first set of proposed activities may include activities external to the online game that can be performed by the first player instead of satisfying the first cost for completion of the first action and/or any other action.

The first set of proposed activities may be specific to the first player. The cost may comprise one or more of: a virtual item, virtual currency, time, or virtual items obtained from a game shop. The proposed activities may be determined based on the cost of the action, values of performance of the individual activities to the game operator, the past history of the player of accepting or not accepting the proposed activities, nature of action, nature of activities and/or any other in game parameters.

The game shop module may be configured to present offers to sell sets of one or more virtual items to the players in a game shop interface. The individual offers for the sets of one or more virtual items may have purchase prices in a virtual currency having a real money value. The offers may include a first offer to sell a first set of one or more items having a first purchase price and/or any other purchase price. The virtual items can be expended by players to satisfy the costs associated with actions such that the first set of one or more items includes a first item that can be expended in the game to satisfy the first cost and/or any other cost.

Various matters may be collected in an inventory. These matters may include, but are not limited to, virtual items, virtual resources, character attributes, and/or character skills. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, NPCs, building materials, portions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The player interface module may be configured to effectuate display of the sets of proposed activities as being associated with the individual offers to which the sets of proposed activities and/or any other activities correspond.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates an exemplary diagram of a user interface which provides players of an online game the option of performing one or more activities external to the online game instead of spend virtual currency to accomplish a specific action in the game, according to an aspect of the invention.

DETAILED DESCRIPTION

Figure 1:
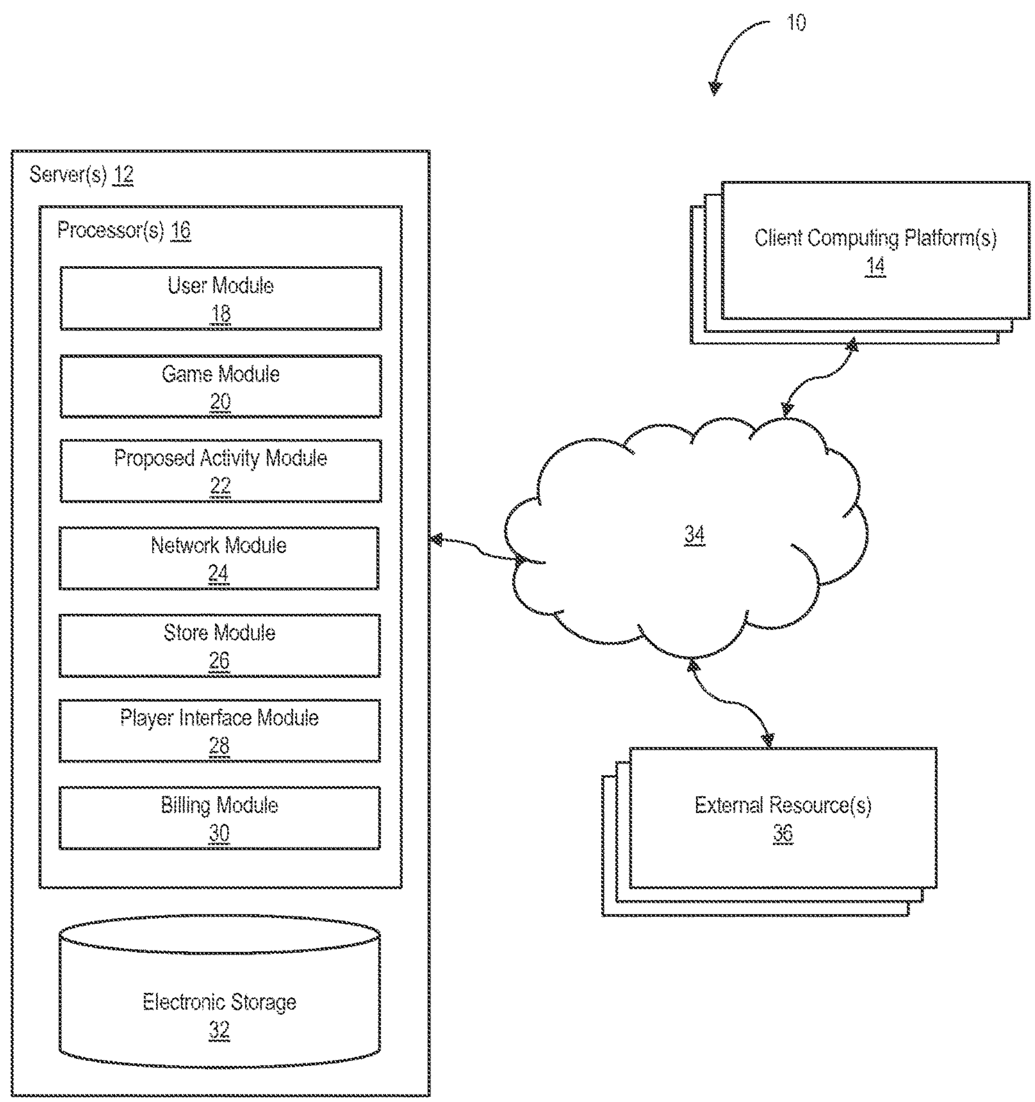
FIG. 1 illustrates an exemplary system configured to providing players of an online game the option of performing one or more activities external to the online game instead of spend virtual currency to accomplish a specific action in the game, according to an aspect of the invention.

FIG. 1 illustrates a system 10 configured to providing players of an online game the option of performing one or more activities external to the online game instead of spend virtual currency to accomplish a specific action in the game. In some implementations, system 10 may include a game server(s) 12. The game server(s) 12 may host a game space in which an online game takes place. The game server(s) 12 may be configured to communicate with one or more client computing platform(s) 14 according to a client/server architecture. The players may access system 10 and/or the virtual space via client computing platform(s) 14.

The game server(s) 12 may be configured to execute one or more computer program modules. The computer program modules may include one or more of a user module 18, a game module 20, a proposed activity module 22, a network module 24, a game shop module 26, a player interface module 28, a billing module 30 and/or any other modules.

The system may comprise a user module 18 configured to store inventories of virtual items that are available to players in the game space. The inventories may include a first inventory and/or any other inventory of virtual items available to a first player in the game space.

The user module 18 may be configured to access and/or manage one or more player profiles and/or player information associated with players of the system 10. The one or more player profiles and/or player information may include information stored by game server(s) 12, one or more of the client computing platform(s) 14, and/or other storage locations. The player profiles may include, for example, information identifying players (e.g., a player name or handle, a number, an identifier, and/or other identifying information) within the virtual space, security login information (e.g., a login code or password), virtual space account information, subscription information, virtual currency account information (e.g., related to currency held in credit for a player), relationship information (e.g., information related to relationships between players in the virtual space), virtual space usage information, demographic information associated with players, interaction history among players in the virtual space, information stated by players, purchase information of players, browsing history of players, a client computing platform identification associated with a player, a phone number associated with a player, and/or other information related to players.

The user module 18 may be configured to store inventories of virtual items including resources that are available to players in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (e.g., money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, portions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The player maintains an inventory for the player's character in which virtual awards may be collected. The inventory may be accessed through an interface. As the character or other entity progresses through the game it may receive access to higher-level items. Higher-level items may be more powerful and/or effective within the game. This may include having parameters (e.g., hit points, attack strength, defense points, speed, etc.) that enhance the functionality of the items in the game. The player may be able to review items within the player's inventory and equip the character and/or other entity with an item appropriate to the current game situation. Items may be dragged from the inventory to a preview window. As items are selected, they may appear either on or next to the character or entity. For example, if the character entity is currently not building and/or researching anything, a building may be built and/or research may be started by—accessing the character's inventory and utilizing virtual items. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency, which may be reflected in the player profiles. In such games, the virtual currency might be represented by virtual coins, virtual cash, or by a number or value stored by the server for that player's benefit. Such virtual currency may represent units of value for use as consideration in transactions in the online game system, and/or may be analogous to legal currency. Virtual currency can be purchased for real money consideration. Such purchases may be made for cash or credit denominated in real money, made be made for another virtual currency previously purchased by a player for real money (e.g., Facebook credits, Bitcoins, and/or other virtual currency). A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may be awarded for leveling up in the game.

The game module 20 may be configured to execute a game instance of a game space. The game instance may be used to facilitate presentation of views of the game space to players. The game instance may be configured to facilitate interaction of the players with the game space and/or each other by performing operations in the game instance in response to commands and/or any other input received from the players.

The game module 20 may implement the instance of the online game to facilitate presentation of the online game on to players on client computing platforms. The presentation may facilitate participation of the players in the game through the reception of commands from the players through the client computing platforms and/or any other platforms. The corresponding actions may be executed in the instance of the online game. The actions may be associated with costs such that completion of a first action in the instance of the online game in response to a command received from a first player may require satisfaction of a first cost associated with the first action by the first player and/or any other player. The first cost may include one or more of time, expenditure of a virtual item (e.g., a virtual resource, virtual currency, a virtual good, and/or other virtual items), and/or other consideration.

The game module 20 may be configured to implement the instance of the virtual space executed by the computer modules to determine state of the virtual space. The state may then be communicated (e.g., via streaming visual data, via object/position data, and/or other state information) from server(s) 12 to client computing platform(s) 14 for presentation to players. The state determined and transmitted to a given client computing platform(s) 14 may correspond to a view for a player character being controlled by a player via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the player. The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other players' inventories, changes experienced by non-player characters, and/or other changes.

The instance of the virtual space may comprise a simulated space that is accessible by players via clients (e.g., client computing platform(s) 14) that present the views of the virtual space to a player. The simulated space may have a topography, express ongoing real-time interaction by one or more players, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 20 is not intended to be limiting. The game module 20 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 20, players may control characters, objects, simulated physical phenomena (e.g., wind, rain, earthquakes, and/or other phenomena), and/or other elements within the virtual space to interact with the virtual space and/or each other. The player characters may include avatars. As used herein, the term "player character" may refer to an object (or group of objects) present in the virtual space that represents an individual player. The player character may be controlled by the player with which it is associated. The player controlled element(s) may move through and interact with the virtual space (e.g., non-player characters in the virtual space, other objects in the virtual space). The player controlled elements controlled by and/or associated with a given player may be created and/or customized by the given player. The player may have an "inventory" of virtual goods and/or currency that the player can use (e.g., by manipulation of a player character or other player controlled element, and/or other items) within the virtual space.

The players may participate in the instance of the virtual space by controlling one or more of the available player controlled elements in the virtual space. Control may be exercised through control inputs and/or commands input by the players through client computing platform(s) 14. The players may interact with each other through communications exchanged within the virtual space. Such communications may include one or more of textual chat, instant messages, private messages, voice communications, and/or other communications. Communications may be received and entered by the players via their respective client computing platform(s) 14. Communications may be routed to and from the appropriate players through server(s) 12 (e.g., through game module 20).

The proposed activity module 22 may be configured effectuate presentation to the players of sets of proposed activities for the individual actions in the online game that can be performed by the players instead of satisfying the costs of the individual actions for completion of the actions. The presentation of a set of proposed activities associated with a given action may tie the set of proposed activities to the given action visually, thematically, and/or in other ways. Presenting different sets of proposed activities associated with different actions in the virtual space may enhance control over the external activities that are available to players. Instead of presenting players with a comprehensive set of proposed activities, and a corresponding value for each of the set of proposed activities (e.g., in virtual currency that can then be used as players chose), sets of proposed activities that are individualized for specific actions (and possibly for specific players) may enhance the integration of such proposed activities into the virtual space, may enhance the revenue generated by the performance of proposed activities by the players versus the value (e.g., in virtual currency) paid back to the players, and/or may provide other enhancements. Examples of proposed activities may comprise: navigating to an external website, viewing video content, listening to audio content, applying for a service, making a purchase from an external merchant, signing-up for a service, submitting demographic information to a third party, participating in a survey, installing an application, and/or purchasing services and/or goods. The proposed activities may include interacting with an electronic object, such as a web page, containing one or more banners, and/or other links associated with opportunities for players to obtain virtual currency and/or any other in-game parameter in association with an advertisement, promotion, and/or sale over the Internet.

The sets of proposed activities may include a first set of proposed activities that is specific to the first action and/or any other action. In some implementations, the proposed activities may thematically match and/or be related to the type of action (e.g., a build, an upgrade, and/or other action) the player is requesting. In a non-limiting example, A player may select a particular building and/or game parameter which they wish to upgrade. In some implementations, they content which the player views and/or purchases may change with respect to the particular building and/or game parameter which they choose to upgrade. In a non-limiting example, when a player chooses building X to upgrade, the options presented to the player may be specific to upgrading building X. In a non-limiting example, when a player chooses building Y to upgrade, the options presented to the player may be specific to upgrading building Y. After viewing and/or purchasing the content, the player may be awarded in-game upgrades, in-game credits, virtual currency, in-game items, and/or in-game unlocks. The first set of proposed activities may be specific to the first player. In some implementations, the proposed activity may be tailored to the first player through analyzing the first player profile. For example, the first player profile may include historical activity information indicating one or more of past proposed activities presented to the first player, past proposed activities performed by the first player, past activities for which proposed activities were presented as a form of payment, past activities for which the first player performed proposed activities as a form of payment, and/or other information related to the presentation to and/or performance of proposed activities. This information may be implemented to further tailor proposed activities to the particular player which may create more incentive for the player to view and/or purchase content. A billing module 30 may be configured to analyze player performance with respect to player participation in proposed activities. The billing module 30 may determine revenue generated through player participation in proposed activities and may be configured to receive revenue from third parties for the external activities it induces players to perform.

The proposed activities may slowly ramp up in scale. Initial activities accessed by the player may be shorter in length and/or require less of player time, player money, and system requirements. The more the player participates in the proposed activities, the greater the activities may require of the player and/or system.

The cost may comprise one or more of: a virtual item, virtual currency, time, and/or virtual items obtained from a game shop. The proposed activities may be determined based on the cost of the action, values of performance of the individual activities to the game operator, the past history of the player of accepting or not accepting the proposed activities, nature of action, nature of activities and/or any other in game parameters.

In some implementations, virtual currency can be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset and/or any other benefit.

In some implementations, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

The network module 24 of the game server(s) 12 may be configured to maintain a connection to the one or more client computing platform(s) 14. For example, the network module 24 may maintain one or more communication lines or ports to enable connection and/or exchange of information with a network 34 and/or other computing platform(s) 14. Information such as state information, game state and game logic may be communicated via network module. The network module 24 may be configured to receive information from the client computing platform(s) 14 as well.

The game shop module 26 may be configured to present a store interface to the players. The store interface may present offers to players to buy item instances of virtual items. The virtual items may include a first virtual item and/or any other item. A virtual item may be an item that can be used in the game instance by the player. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

The game shop module 26 may be configured to present offers to sell sets of one or more virtual items to the players in a game shop interface. The individual offers for the sets of one or more virtual items may have purchase prices in a virtual currency having a real money value. The offers may include a first offer to sell a first set of one or more items having a first purchase price and/or any other purchase price. The virtual items can be expended by players to satisfy the costs associated with actions such that the first set of one or more items includes a first item that can be expended in the game to satisfy the first cost and/or any other cost.

Various matters may be collected in an inventory. These matters may include, but are not limited to, virtual items, virtual resources, character attributes, and/or character skills. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, NPCs, building materials, portions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into portions, mine, assemble objects into other objects, fly, and/or enchant other player characters.

The game shop module 26 may be configured to effectuate presentation to the players of offers to purchase resources. The offers may include a first offer for the first player to purchase a first set of one or more virtual items. The virtual items may include a virtual good, a virtual currency, and/or other virtual items as described above. For example, the game shop module 26 may be configured such that the offers presented to the first player may be restricted to offers having prices in a first price range. The first price range may be determined based on the player metric for the first player, and/or the player metric for other players. The game shop module 26 may be configured such that the first price range may change as participation by the first player in the game causes the player metric for the first player to change. The game shop module 26 may be configured such that the first price range may be bounded by one or more both of a minimum value and/or a maximum value. The game shop module 26 may be configured such that the offers having prices below the minimum value may not be available for purchase by the first player. The game shop module 26 may be configured such that offers having prices above the maximum value may be locked. This may mean the offers having prices above the maximum value may be unavailable for purchase by the first player independent from whether the first player has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

The player interface module 28 may be configured to effectuate display of the sets of proposed activities as being associated with the individual offers to which the sets of proposed activities and/or any other activities correspond. The player may be presented the option to select which content they choose to access and/or the content may be predetermined and/or selected for them.

The game server(s) 12, client computing platform(s) 14, and/or external resource(s) 36 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 36 may be operatively linked via some other communication media.

Game server(s) 12 may include electronic storage 32, one or more processors 16, and/or other components. Game server(s) 12 may include communication lines, or ports to enable the exchange of information with a network 34 and/or other computing platform(s) 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 32 may comprise non-transitory storage media that electronically stores information. The electronic storage media of electronic storage 32 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor(s) 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24, 26, 28 and/or 30. Processor(s) 16 may be configured to execute modules 18, 20, 22, 24, 26, 28 and/or 30 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, 28 and/or 30 are illustrated in FIG. 1 as being implemented within a single processing unit, in implementations in which processor includes multiple processing units, one or more of modules 18, 20, 22, 24, 26, 28 and/or 30 may be implemented remotely from the other modules. The description of the functionality provided by the different modules 18, 20, 22, 24, 26, 28 and/or 30 described below is for illustrative purposes, and is not intended to be limiting, as any of modules 18, 20, 22, 24, 26, 28 and/or 30 may provide more or less functionality than is described. For example, one or more of modules 18, 20, 22, 24, 26, 28 and/or 30 may be eliminated, and some or all of its functionality may be provided by other ones of modules 18, 20, 22, 24, 26, 28 and/or 30. As another example, processor(s) 16 may be configured to execute one or more additional modules that may perform some or all of the functionality attributed below to one of modules 18, 20, 22, 24, 26, 28 and/or 30.

A given client computing platform(s) 14 may include one or more processors configured to execute computer program modules. The computer program modules may be configured to enable an expert or player associated with the given client computing platform(s) 14 to interface with system 10, game server(s) 12, and/or external resource(s) 36, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 36 may include sources of information, hosts and/or providers of virtual spaces outside of system 10, external entities participating with system 10, and/or other resources. In some implementations, some or all of the functionality attributed herein to external resource(s) 36 may be provided by resources included in system 10.

Figure 2:
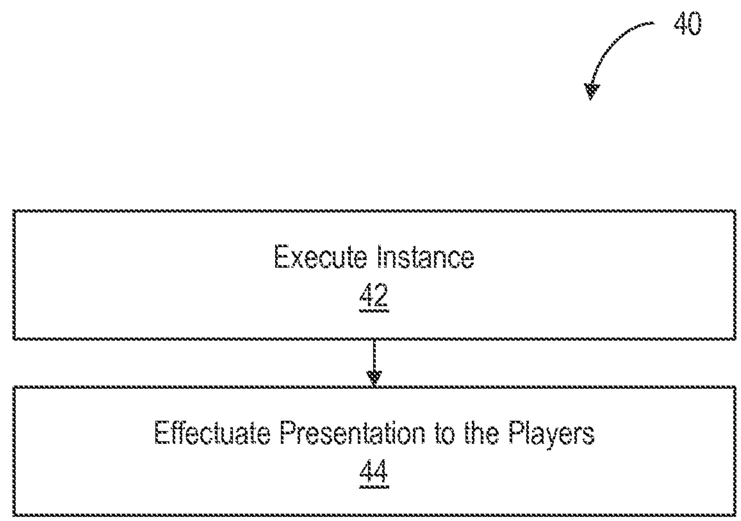
FIG. 2 illustrates an exemplary method of providing players of an online game the option of performing one or more activities external to the online game instead of spend virtual currency to accomplish a specific action in the game, according to an aspect of the invention.

FIG. 2 illustrates a method 40 configured to provide players of an online game the option of performing one or more activities external to the online game instead of spend virtual currency to accomplish a specific action in the game, according to an aspect of the invention. The operations of method 40 presented below are intended to be illustrative. In some embodiments, method 40 may be accomplished with one or more additional operations not described, and/or without one or more of the operations discussed. The order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a game module the same as or similar to game module 20 (shown in FIG. 1 and described above).

At an operation 44, the executed instance of the virtual space may effectuate presentation to the players. In some implementations, operation 44 may be performed by a proposed activity module the same as or similar to proposed activity module 22 (shown in FIG. 1 and described above).

Figure 3:
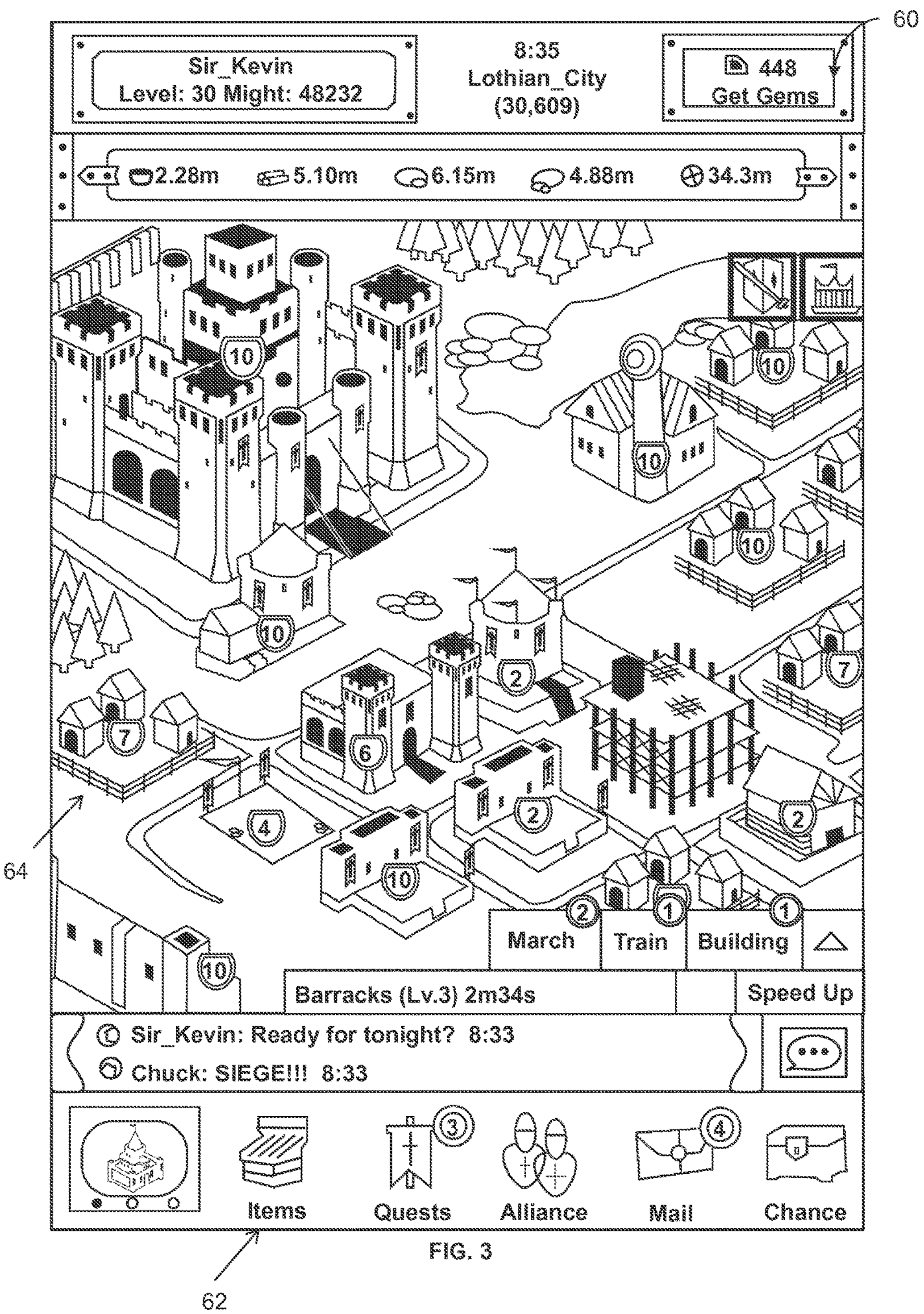
FIG. 3 illustrates an exemplary diagram of a user interface which provides players of an online game the option of performing one or more activities external to the online game instead of spend virtual currency to accomplish a specific action in the game, according to an aspect of the invention.

FIG. 3 illustrates an exemplary diagram of a user interface which provides players of an online game the option of performing one or more activities external to the online game instead of spend virtual currency to accomplish a specific action in the game, according to an aspect of the invention. As shown, user interface 60 enables a player to view a list of virtual items available for purchase by selecting the items 62 tab. In some implementations, the player may select a building 64 for upgrading. The player may spend virtual currency to upgrade the building, items acquired during the game to upgrade the building, and/or view proposed activities to upgrade the building.

Figure 4:
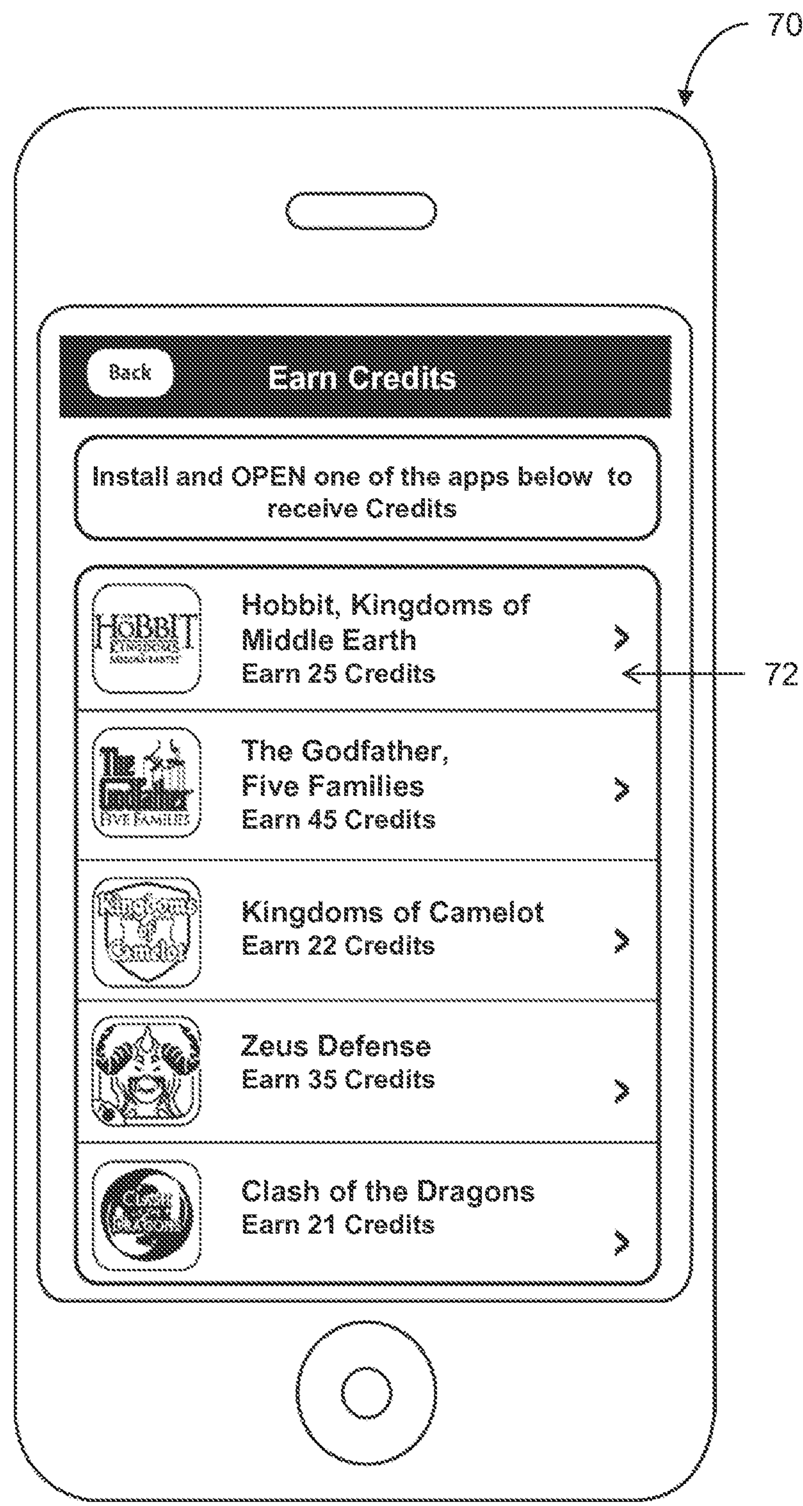
FIG. 4 illustrates an exemplary diagram of a user interface which provides players of an online game the option of performing one or more activities external to the online game instead of spend virtual currency to accomplish a specific action in the game, according to an aspect of the invention.

FIG. 4 illustrates an exemplary diagram of a user interface 70 which provides players of an online game the option of performing one or more activities external to the online game instead of spend virtual currency to accomplish a specific action in the game, according to an aspect of the invention. A player may select which content 72 they want to view and/or content may be predetermined for them. After viewing the content, the player may be awarded in-game credits, virtual currency, in-game items, and/or in-game unlocks.

Figure 5:
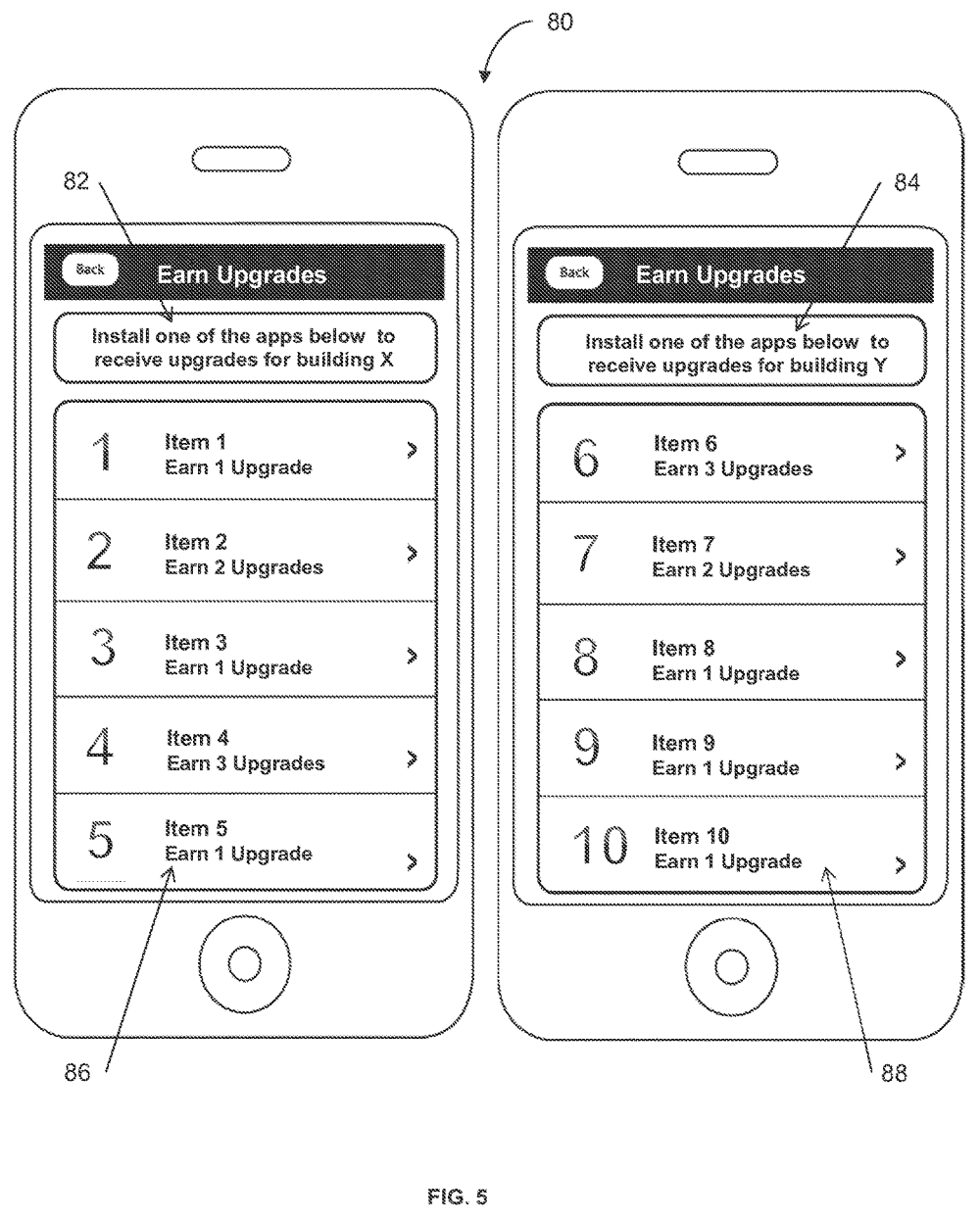

FIG. 5 illustrates an exemplary diagram of a user interface 80 which provides players of an online game the option of performing one or more activities external to the online game instead of spend virtual currency to accomplish a specific action in the game, according to an aspect of the invention. A player may select a particular building and/or game parameter which they wish to upgrade. In some implementations, they content which the player views and/or purchases may change with respect to the particular building and/or game parameter which they choose to upgrade. In a non-limiting example, when a player chooses building X 82 to upgrade, the options 86 presented to the player may be specific to upgrading building X. In a non-limiting example, when a player chooses building Y 84 to upgrade, the options 88 presented to the player may be specific to upgrading building Y. After viewing and/or purchasing the content, the player may be awarded in-game upgrades, in-game credits, virtual currency, in-game items, and/or in-game unlocks.

Figure 6:
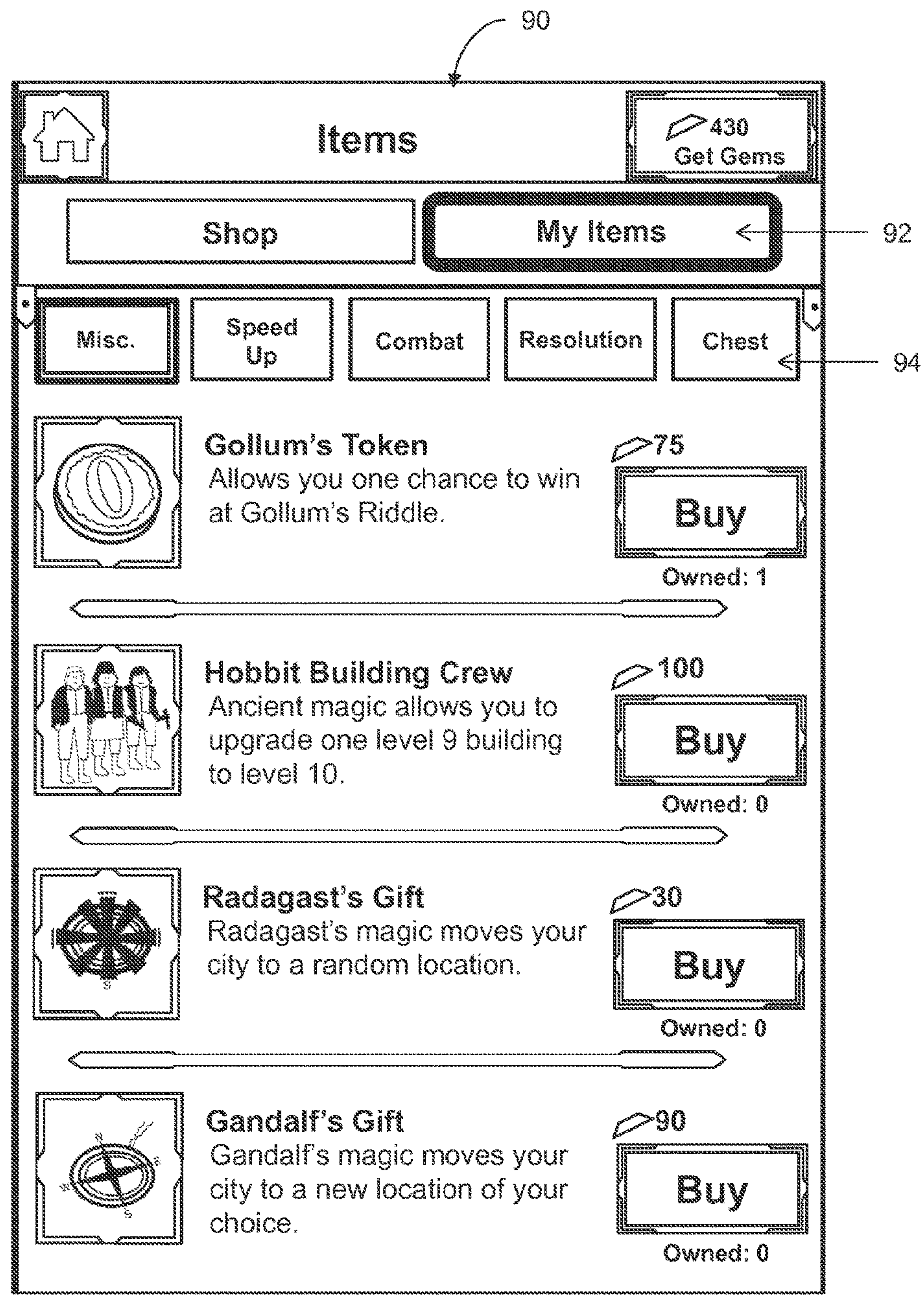
FIG. 6 illustrates an exemplary diagram of a user interface which provides players of an online game the option of performing one or more activities external to the online game instead of spend virtual currency to accomplish a specific action in the game, according to an aspect of the invention.

FIG. 6 illustrates an exemplary diagram of a user interface 90 which provides players of an online game the option of performing one or more activities external to the online game instead of spend virtual currency to accomplish a specific action in the game, according to an aspect of the invention. In some implementations, the player may select the my items tab 92, and view from a category 94 of virtual in-game goods obtained.

Figure 7:
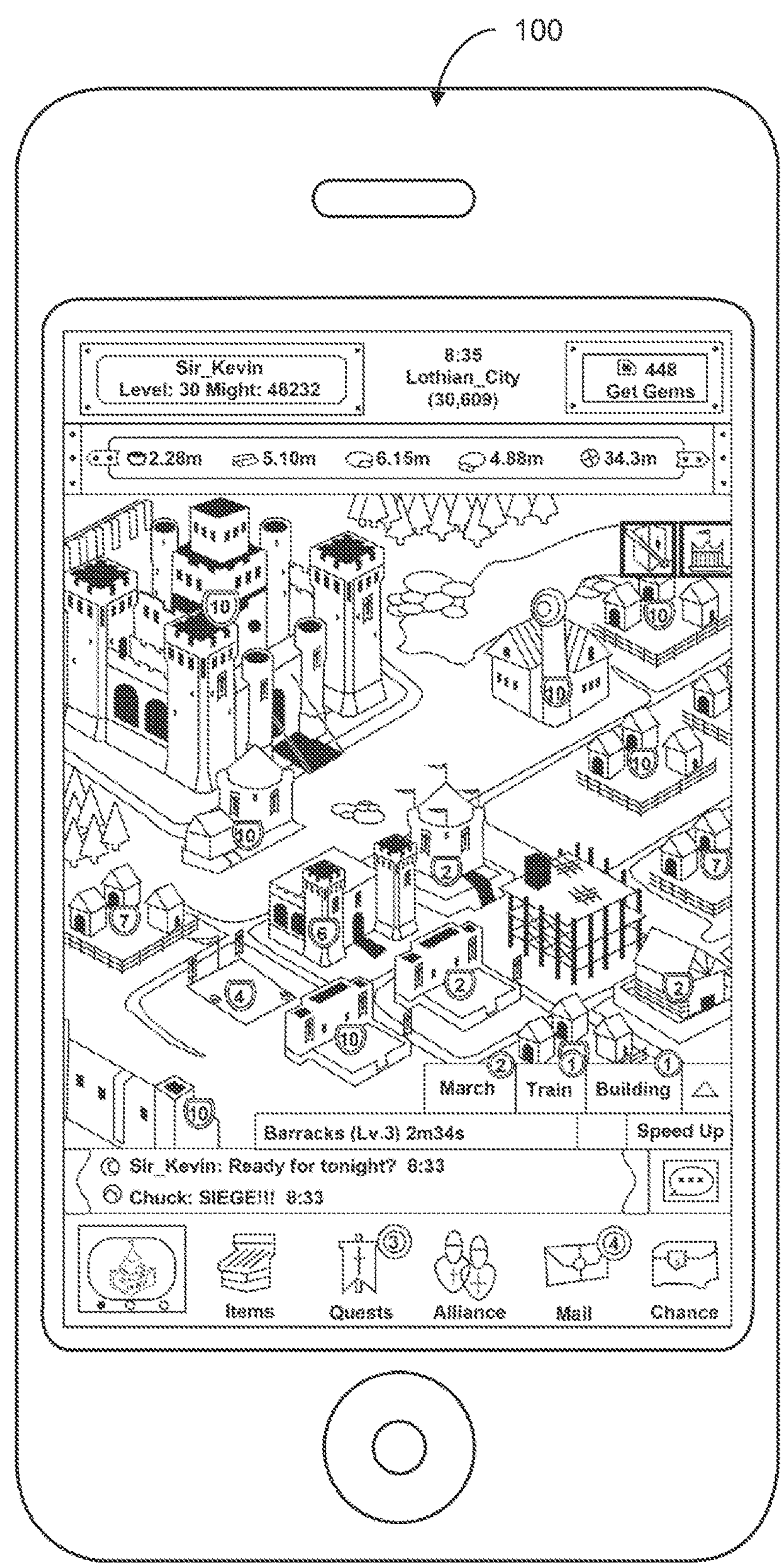
FIG. 7 illustrates an exemplary diagram of a user interface which provides players of an online game the option of performing one or more activities external to the online game instead of spend virtual currency to accomplish a specific action in the game, according to an aspect of the invention.

FIG. 7 illustrates an exemplary diagram of a user interface 100 which provides players of an online game the option of performing one or more activities external to the online game instead of spend virtual currency to accomplish a specific action in the game, according to an aspect of the invention. There may be several platforms in which the game may be implemented. Some platforms may include hardware platforms, operating system platforms and/or software platforms. In some implementations, hardware platform may include different types of systems in general (e.g., mainframe, workstation, desktop, handheld and/or embedded) and/or the specific type of processor (e.g., x86, SPARC, PowerPC and/or Alpha).

Figure 8:
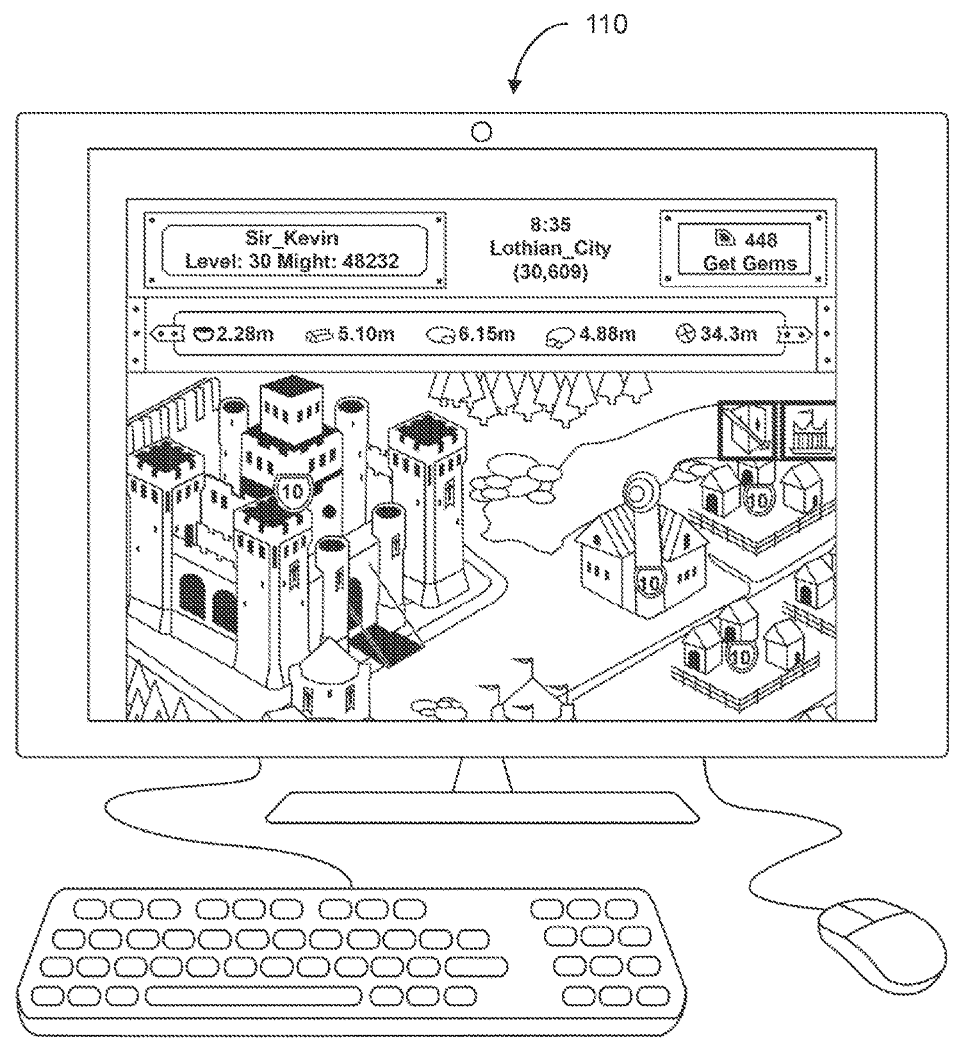
FIG. 8 illustrates an exemplary diagram of a user interface which provides players of an online game the option of performing one or more activities external to the online game instead of spend virtual currency to accomplish a specific action in the game, according to an aspect of the invention.

FIG. 8 illustrates an exemplary diagram of a user interface 110 which provides players of an online game the option of performing one or more activities external to the online game instead of spend virtual currency to accomplish a specific action in the game, according to an aspect of the invention.

Figure 9:
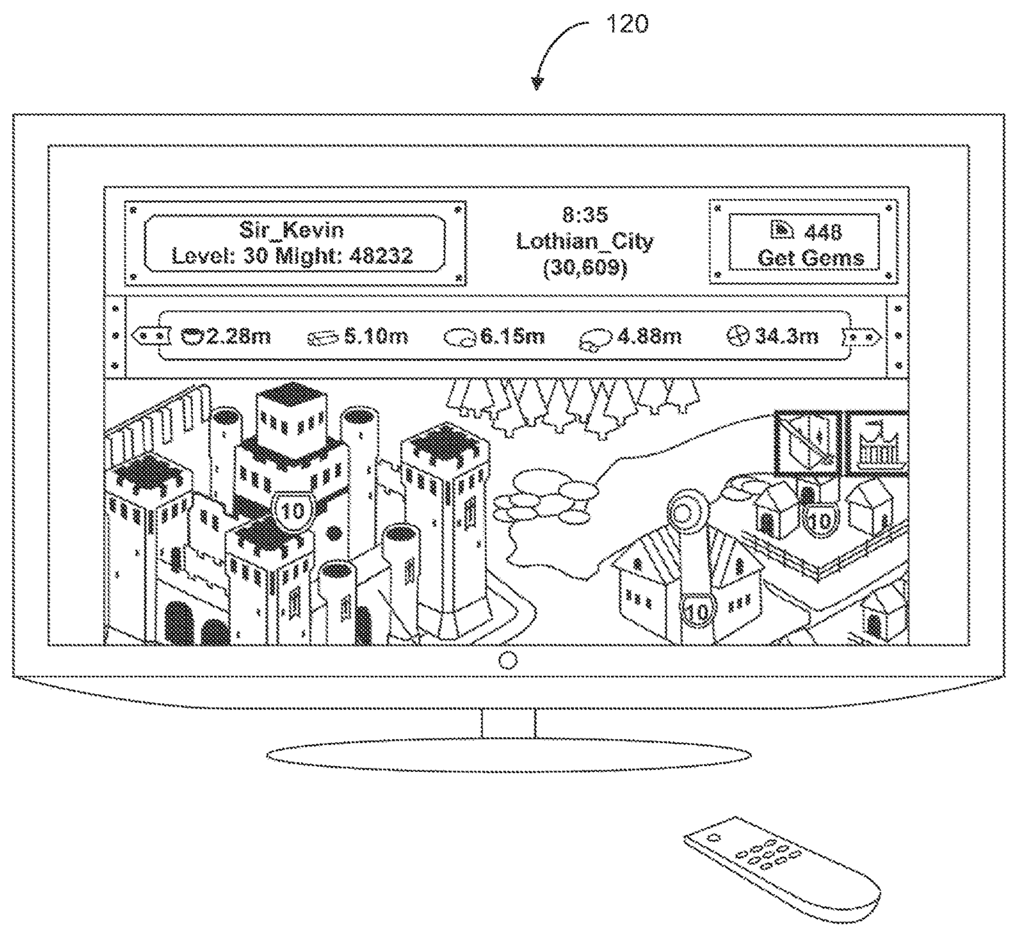
FIG. 9 illustrates an exemplary diagram of a user interface which provides players of an online game the option of performing one or more activities external to the online game instead of spend virtual currency to accomplish a specific action in the game, according to an aspect of the invention.

FIG. 9 illustrates an exemplary diagram of a user interface 120 which provides players of an online game the option of performing one or more activities external to the online game instead of spend virtual currency to accomplish a specific action in the game, according to an aspect of the invention.

It would be understood by one of ordinary skill in the art that the player interfaces may not be limited to the embodiment illustrated in FIGS. 3-8. The player interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating satisfaction of costs for in-game actions through activities external to an online game, the system comprising:

one or more processors configured by machine-readable instructions to:

execute an instance of online game, and to implement the instance of the online game to facilitate presentation of the online game to players on client computing platforms, such presentation facilitating participation of the players in the game through the reception of commands from the players through the client computing platforms, and executing corresponding actions in the instance of the online game, wherein the actions are associated with costs such that completion of a first action in the instance of the online game in response to a command received from a first player requires satisfaction of a first cost associated with the first action by the first player and completion of the first action in the instance of the online game in response to a second command received from a second player requires satisfaction of the first cost associated with the first action by the second player, the first cost including one or both of time and/or expenditure of a virtual item; and effectuate presentation to the players of sets of proposed activities for the individual actions in the online game that can be performed by the players instead of satisfying the costs of the individual actions for completion of the actions, the sets of proposed activities including a first set of proposed activities that is specific to the first player wherein individual activities within the first set of proposed activities are associated with a given benefit amount specific to the first action such that a first individual activity within the first set of proposed activities is associated with a first benefit amount specific to the first action, and a second set of proposed activities that is specific to the second player, the first set of proposed activities including activities external to the online game that can be performed by the first player instead of satisfying the first cost for completion of the first action and the second set of proposed activities including activities external to the online game that can be performed by the second player instead of satisfying the first cost for completion of the first action, wherein the first set of proposed activities specific to the first player includes at least one proposed activity that is different than proposed activities included in the second set of proposed activities specific to the second player;

receive selection of the first individual activity from the first set of proposed activities by the first player;

obtain an indication of successful performance of the first individual activity by the first player; and complete the first action in the instance of the online game in accordance with the first benefit amount for the first player responsive to receiving the indication of successful performance of the first individual activity by the first player.

2. The system of claim 1, wherein the first set of proposed activities is specific to the first action.

3. The system of claim 1, wherein the cost may comprise one or more of: a virtual item, virtual currency, time, or virtual items obtained from a game shop.

4. The system of claim 1, wherein the sets of proposed activities are determined based on the cost of the action, values of performance of the individual activities to the game operator, the past history of the player of accepting or not accepting the proposed activities, nature of action, or nature of activities.

5. The system of claim 1, wherein the one or more processors are configured by machine-readable instructions to present offers to sell sets of one or more virtual items to the players in a game shop interface, the individual offers for the sets of one or more virtual items having purchase prices in a virtual currency having a real money value, the offers including a first offer to sell a first set of one or more items having a first purchase price, wherein the virtual items can be expended by players to satisfy the costs associated with actions such that the first set of one or more items includes a first item that can be expended in the game to satisfy the first cost.

6. The system of claim 1, wherein the one or more processors are configured by machine-readable instructions to effectuate display of the sets of proposed activities as being associated with the individual offers to which the sets of proposed activities correspond.

7. A computer implemented method for facilitating game events, the method being implemented in a computer system that includes one or more physical processors configured by machine-readable instructions, the method comprising:

executing an instance of online game, and implementing the instance of the online game to facilitate presentation of the online game on to players on client computing platforms, such presentation facilitating participation of the players in the game through the reception of commands from the players through the client computing platforms, and executing corresponding actions in the instance of the online game, wherein the actions are associated with costs such that completion of a first action in the instance of the online game in response to a command received from a first player requires satisfaction of a first cost associated with the first action by the first player and completion of the first action in the instance of the online game in response to a second command received from a second player requires satisfaction of the first cost associated with the first action by the second player, the first cost including one or both of time and/or expenditure of a virtual item; and effectuating presentation to the players of sets of proposed activities for the individual actions in the online game that can be performed by the players instead of satisfying the costs of the individual actions for completion of the actions, the sets of proposed activities including a first set of proposed activities that is specific to the first player wherein individual activities within the first set of proposed activities are associated with a given benefit amount specific to the first action such that a first individual activity within the first set of proposed activities is associated with a first benefit amount specific to the first action, and a second set of proposed activities that is specific to the second player, the first set of proposed activities including activities external to the online game that can be performed by the first player instead of satisfying the first cost for completion of the first action and the second set of proposed activities including activities external to the online game that can be performed by the second player instead of satisfying the first cost for completion of the first action, wherein the first set of proposed activities specific to the first player includes at least one proposed activity that is different than proposed activities included in the second set of proposed activities specific to the second player;

receiving selection of the first individual activity from the first set of proposed activities by the first player;

obtaining an indication of successful performance of the first individual activity by the first player; and completing the first action in the instance of the online game in accordance with the first benefit amount for the first player responsive to receiving the indication of successful performance of the first individual activity by the first player.

8. The method of claim 7, wherein the first set of proposed activities is specific to the first action.

9. The method of claim 7, wherein the cost may comprise one or more of: a virtual item, virtual currency, time, or virtual items obtained from a game shop.

10. The method of claim 7, wherein the sets of proposed activities are determined based on the cost of the action, values of performance of the individual activities to the game operator, the past history of the player of accepting or not accepting the proposed activities, nature of action, or nature of activities.

11. The method of claim 7, configured to present offers to sell sets of one or more virtual items to the players in a game shop interface, the individual offers for the sets of one or more virtual items having purchase prices in a virtual currency having a real money value, the offers including a first offer to sell a first set of one or more items having a first purchase price, wherein the virtual items can be expended by players to satisfy the costs associated with actions such that the first set of one or more items includes a first item that can be expended in the game to satisfy the first cost.

12. The method of claim 7, configured to effectuate display of the sets of proposed activities as being associated with the individual offers to which the sets of proposed activities correspond.

* * * * *